United States Patent
Black

[19]

[11] Patent Number: 6,134,440
[45] Date of Patent: *Oct. 17, 2000

[54] METHOD AND APPARATUS FOR PERFORMING MOBILE STATION ASSISTED HARD HANDOFF USING OFF LINE SEARCHING

[75] Inventor: Peter J. Black, La Jolla, Calif.

[73] Assignee: Qualcomm Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/013,413

[22] Filed: Jan. 26, 1998

[51] Int. Cl.[7] ........................................ H04Q 7/38
[52] U.S. Cl. .............................. 455/436; 455/437
[58] Field of Search .................... 455/437, 436, 455/438, 439, 443, 524, 525, 226.1, 226.2, 226.3; 370/331, 332, 333

[56] References Cited

U.S. PATENT DOCUMENTS

| | | | |
|---|---|---|---|
| 5,285,447 | 2/1994 | Hulsebosch | 455/437 |
| 5,903,550 | 5/1999 | Spock | 370/335 |

FOREIGN PATENT DOCUMENTS

| | | |
|---|---|---|
| 0576079 | 12/1993 | European Pat. Off. . |
| 9631078 | 10/1996 | WIPO . |
| 9729611 | 8/1997 | WIPO . |

*Primary Examiner*—Lee Nguyen
*Attorney, Agent, or Firm*—Philip Wadsworth; Bruce W. Greenhaus; Pavel Kalousek

[57] ABSTRACT

A method and apparatus for minimizing the amount of time that a mobile station is to be out of communication with an "origination" base station while searching for a suitable system to which to perform a mobile station assisted hard handoff. After being directed to search for pilot signals in an alternate frequency band, the mobile station tunes to that alternate frequency and samples the incoming data, storing those samples in memory. When a sufficient number of samples have been stored, the mobile station retunes to the origination frequency. The forward link data is again received by the mobile station, and reverse link data can be successfully transmitted to the origination base station. After retuning to the origination frequency, a searcher in the mobile station will subsequently be employed to search for pilot signal offsets utilizing the stored data collected from the alternate frequency.

8 Claims, 6 Drawing Sheets

REMOTE STATION

METHOD AND APPARATUS FOR PERFORMING MOBILE STATION ASSISTED HARD HANDOFF USING OFF LINE SEARCHING

BACKGROUND OF THE INVENTION

I. Field of the Invention

The present invention relates to communications systems. More particularly, the present invention relates to a novel and improved method for hard handoff between different wireless communication systems.

II. Description of the Related Art

In a code division multiple access (CDMA) spread spectrum communication system, a common frequency band is used for communication with all base stations within that system. An example of such a system is described in the TIA/EIA Interim Standard IS-95-A entitled "Mobile Station-Base Station Compatibility Standard for Dual-Mode Wideband Spread Spectrum Cellular System", incorporated herein by reference. The generation and receipt of CDMA signals is disclosed in U.S. Pat. No. 4,901,307 entitled "SPREAD SPECTRUM MULTIPLE ACCESS COMMUNICATION SYSTEMS USING SATELLITE OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM" both of which are assigned to the assignees of the present invention and incorporated herein by reference.

Signals occupying the common frequency band are discriminated at the receiving station by using a high rate pseudonoise (PN) code. The PN code modulates signals transmitted from the base stations and the mobile stations. Signals from different base stations can be separately received at the receiving station by discrimination of the unique time offset that is introduced in the PN codes assigned to each base station. The high rate PN modulation also allows the receiving station to receive a signal from a single transmission station where the signal has traveled from the the base station to the receiving station over several different distinct propagation paths (commonly referred to as "multipathing"). Demodulation of multipath signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

The use by all base stations within a particular system of a common frequency band allows simultaneous communication between a mobile station and more than one base station, a condition known as soft handoff. On implementation of a soft handoff method and apparatus is disclosed in U.S. Pat. No. 5,101,501 entitled "SOFT HANDOFF IN A CDMA CELLULAR TELEPHONE SYSTEM" and U.S. Pat. No. 5,267,261 entitled "MOBILE STATION ASSISTED SOFT HANDOFF IN A CDMA CELLULAR COMMUNICATIONS SYSTEM", both assigned to the assignee of the present invention and incorporated herein by reference. Similarly, a mobile station can be simultaneously communicating with two sectors of the same base station, known as softer handoff as disclosed in copending U.S. Patent Application entitled "METHOD AND APPARATUS FOR PERFORMING HANDOFF BETWEEN SECTORS OF A COMMON BASE STATION", U.S. Pat. No. 5,625,876, issued Apr. 29, 1997, assigned to the assignee of the present invention and incorporated herein by reference. An important feature is that both soft handoffs and softer handoffs make the new connection before breaking the existing one.

If a mobile station travels outside the boundary of the system with which it is currently communicating, it is desirable to maintain the communication link by transferring the call to a neighboring system, if one exists. The neighboring system may use any wireless technology, examples of which are CDMA, NAMPS, advanced mobile phone service (AMPS), time devision multiple access (TDMA), or global mobile systems (GSM). If the neighboring system uses CDMA on the same frequency band as the current system, an inter-system soft handoff can be performed. In situations where inter-system soft handoff is not available, the communication link is transferred through a hard handoff where the current connection is broken before a new one is made. Examples of typical hard handoff situations include: (1) the situation in which a mobile station is traveling from region serviced by a CDMA system to a region serviced by a system employing an alternate technology and (2) the situation in which a call is transferred between two CDMA systems which use different frequency bands (interfrequency hard handoff).

Inter-frequency hard handoffs can also occur between base stations of the same CDMA system. For example, a region of high demand such as a dense urban area may require a greater number of frequencies to service demand than the suburban region surrounding it. It may not be cost effective to deploy all available frequencies throughout the system. A call originating on a frequency deployed only in the high congestion area must be handed off as the user travels to a less congested area. Another example is system which encounters interference from another service operating on an interferring frequency within the system's boundaries. As users travel into an area suffering from interference from another service, their call may need to be handed off to a different frequency.

Handoffs can be initiated using a variety of techniques. Handoff techniques, including those using signal quality measurements to initiate a handoff, are found in copending U.S. Pat. No. 5,697,055 entitled "METHOD AND APPARATUS FOR HANDOFF BETWEEN COMMUNICATION SYSTEMS", U.S. Pat. No. 5,999,816, issued Dec. 9, 1997, assigned to the assignee of the present invention and incorporated herein by reference. Further disclosure of handoffs, including measurement of round-trip signal delay to initiate handoff, is disclosed in copending U.S. Pat. No. 5,848,063 entitled "METHOD AND APPARATUS FOR HARD HANDOFF IN A CDMA SYSTEM", issued Dec. 8, 1998, assigned to the assignee of the present invention and incorporated herein by reference. Handoffs from CDMA systems to alternate technology systems are disclosed in copending U.S. Pat. No. 5,594,718 entitled "METHOD AND APPARATUS FOR PROVIDING MOBILE UNIT ASSISTED HARD HANDOFF FROM A CDMA COMMUNICATION SYSTEM TO AN ALTERNATIVE ACCESS COMMUNICATION SYSTEM", issued Jan. 14, 1997, assigned to the assignee of the present invention and incorporated herein by reference. In the '718 patent, pilot beacons are placed at the boundaries of the system. When a mobile station reports these pilot beacons to the base station, the base station knows that the mobile station is approaching the boundary, and in response, prepares for the possibility of an intersystem hard handoff.

When a system has determined that a call should be transferred to another system via hard handoff, a message is sent to the mobile station directing it to do so along with parameters that enable the mobile station to connect with the destination system. The system from which the mobile station is departing has only estimates of the mobile station's actual location and environment, so the parameters sent to the mobile station are not guaranteed to be accurate. For example, with beacon aided handoff, the measurement of the pilot beacon's signal strength can be a valid criteria for triggering the handoff. However, the appropriate base station or base stations in the destination system which can effectively communicate with the mobile station are not necessarily known. These base stations with which the mobile can effectively communicate and which are considered to be good candidates based upon additional criteria are maintained in a list or "set" within the mobile station and commonly referred to as the "Active Set". Inclusion in the active set implies allocation of foward link resources. Allocation of all possible candidates as opposed to the minimal sufficient set is wasteful of system resources, reducing available system capacity. Even if all of the base stations in the destination system which can effectively communicate with the mobile station are known, including all such base stations may exceed the maximum number allowable in the Active Set.

In order for the mobile station to communicate with the destination system, contact with the old system must cease. If the parameters given to the mobile station are not valid for any reason (i.e. changes in the mobile station's environment or lack of precise location information at the base station) the new communication link will not be formed, and the call may be dropped. After an unsuccessful handoff attempt, the mobile station can revert back to the previous system if it is still possible to do so. However, with no further information and no significant change in the mobile station's environment, repeated attempts to perform a handoff may also fail.

A method for performing additional hard handoff attempts with greater probability of success is disclosed in copending U.S. Patent entitled "METHOD AND APPARATUS FOR PERFORMING MOBILE ASSISTED HARD HANDOFF BETWEEN COMMUNICATION SYSTEMS", U.S. Pat. No. 5,999,816, issued Dec. 7, 1999 assigned to the assignee of the present invention and incorporated herein by reference. In the 5,999,816 patent, mobile stations tune temporarily to the frequency of the hard handoff destination system and search for available pilot signals (hereafter referred to simply as "pilots") on that frequency, for inclusion of the associated base stations in the active set. After the searching task is completed, the mobile station will retune to the original frequency to resume current communications. While tuned to an alternate frequency, any frames of data generated by the mobile station or transmitted by the base station will be corrupted. Typically, the base station will provide only a subset of the possible offsets (commonly referred to as an "enable list") for the mobile station to search. Even so, the duration of the searching can be so long as to potentially corrupt a number of frames of data. As such, there is a need for searching techniques which minimize the duration of time that a mobile station spends tuned to an alternate frequency so as to minimize corruption of the active communication link. Such searching techniques will clearly improve the quality of systems employing the hard handoff techniques described above.

SUMMARY OF THE INVENTION

The present invention is a method and apparatus for minimizing the amount of time that a mobile station is to be out of communication with an "origination" base station while searching for a suitable system to which to perform a mobile station assisted hard handoff.

In the present invention, after being directed to search for pilot signals in an alternate frequency band, the mobile station tunes to that alternate frequency and samples the incoming data, storing those samples in memory. During the time that the mobile station is tuned to the alternate frequency, all data being transmitted to the mobile station on the forward link is lost. Similarly, any reverse link data transmitted by the mobile station would be transmitted on the alternate frequency. Therefore, such reverse link data would not be received at the origination base station. When a sufficient number of samples have been stored, the mobile station retunes to the origination frequency. At this time, the forward link data is again received by the mobile station, and reverse link data can be successfully transmitted to the origination base station. After retuning to the origination frequency, a searcher in the mobile station will subsequently be employed to search for pilot signal offsets utilizing the stored data collected from the alternate frequency. In accordance with the present invention, due to the relatively short period of time required to sample and store information on the alternative frequency, the active communication link is not broken. Neither is the active communication link affected by the subsequent off-line search.

Because less time is required to sample the data on the alternate frequency than is required to actively search for pilot signals in real time, and because the communication link is corrupted by the hard handoff process only while the mobile station is tuned to the alternate frequency, the present invention minimizes the interruption of the forward and reverse links on the originating system. In fact, the error correction coding employed in modern communication systems can eliminate all errors introduced by sampling the alternate frequency, if the sampling time is small enough.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
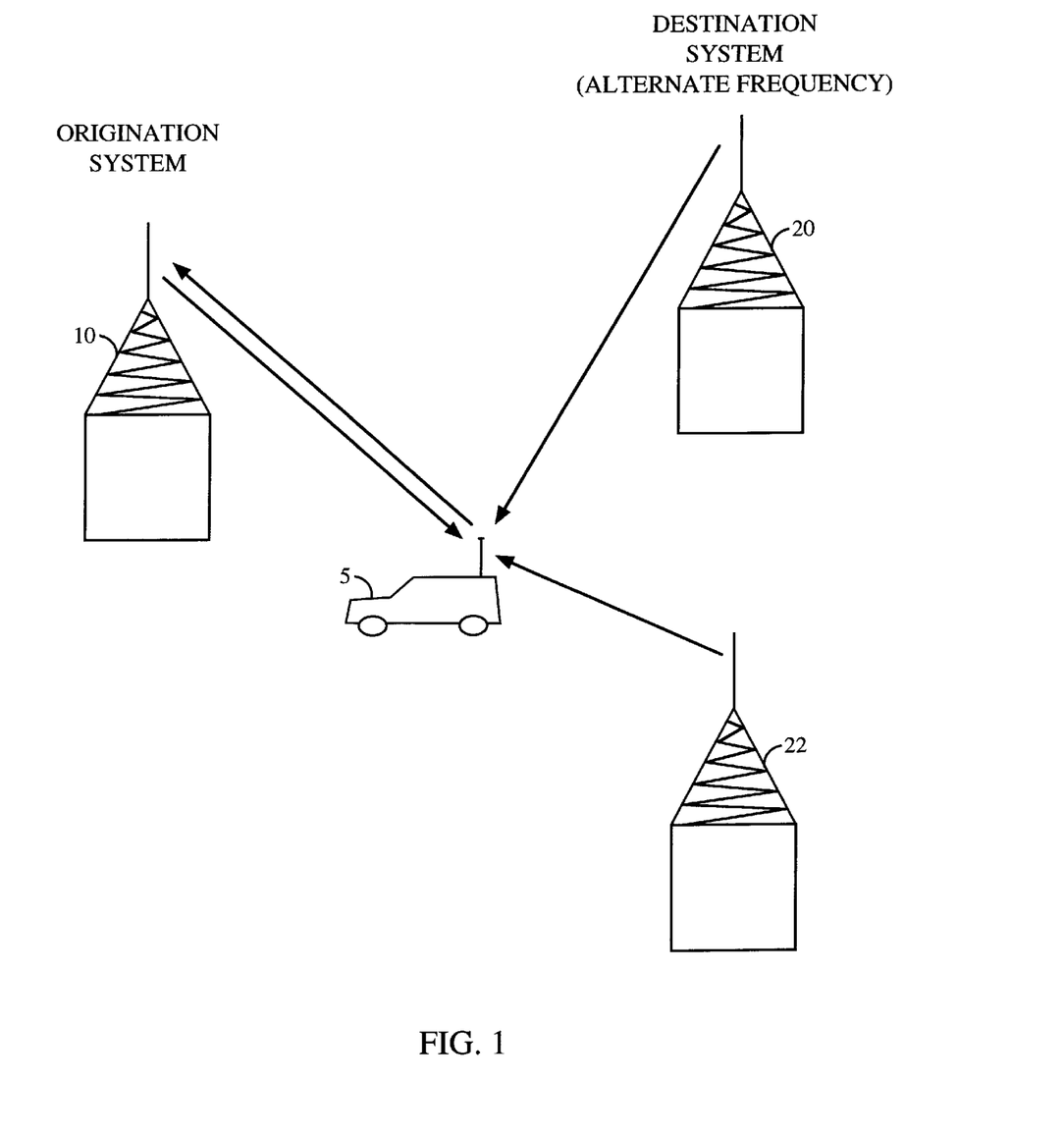
FIG. 1 is a schematic overview of a spread spectrum CDMA communications system in accordance with the present invention.

FIG. 1 depicts a communication system employing an embodiment of the present invention. Mobile station 5 is actively communicating with a 25 fixed communication system on a forward link 12 and reverse link 14 through an "origination" base station 10. Origination base station 10 is part of an "origination" system and transmits and receives information over forward link 12 and reverse link 14, respectively, on a first frequency, $f1$. Mobile station 5 is shown to be traveling from the origination system into a "destination" system which transmits and receives information on a second frequency, $f2$. The destination system includes "destination" base stations 20 and 22, which are not in active communication with mobile station 5. However, pilot signals (hereafter referred to simply as "pilots") from destination base stations 20 and 22 can be received by mobile station 5 if mobile station 5 is tuned to frequency $f2$. Both the origination and destination systems are part of the fixed communication system that allows the mobile station to communicate with other communication devices, such as conventional telephones wired to the public switch telephone network or other wireless communication devices. It should be understood that the fixed communication system can comprise any device or combination of devices that provides wireless communication between the mobile system and other communication devices.

In accordance with one embodiment of the present invention, origination base station 10 utilizes mobile station 5 in performing a mobile station assisted interfrequency hard handoff in accordance with the method and apparatus disclosed in copending U.S. Patent Application entitled "METHOD AND APPARATUS FOR PERFORMING MOBILE ASSISTED HARD HANDOFF BETWEEN COMMUNICATION SYSTEMS", Ser. No. 08/816,746, filed Feb. 18, 1997, assigned to the assignee of the present invention. Origination base station 10 transmits a "Tune_Message" to mobile station 5 directing it to tune to an alternate frequency, $f2$ in this case, and to search for a set of available pilots, the pilots of destination base stations 20 and 22, for example. It should be understood that in different systems, the particular criteria for which the mobile station searches will vary. Upon receipt of the Tune_Message, mobile station 5 tunes to frequency $f2$ and performs the search as directed. Once the search is completed, mobile station 5 retunes to frequency $f1$ and resumes communication with origination base station 10. Mobile station 5 transmits a message indicating the results from the search to origination base station 10 of the origination system. The origination system, in conjunction with the destination system, determines whether to perform a hard handoff and to which destination base station(s) in the destination system.

Figure 2A:
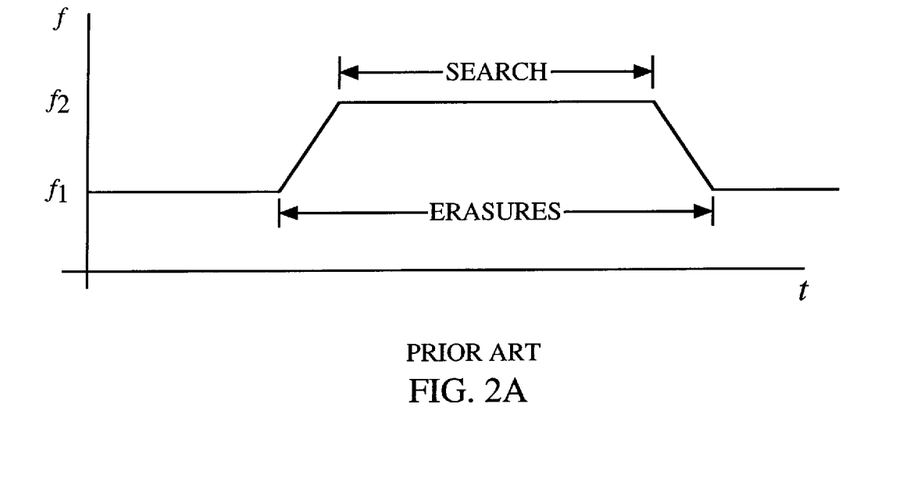
FIGS. 2A–2B represent graphically the benefits of employing the present invention over the prior art.

While mobile station 5 is tuned to frequency $f2$, all forward link traffic from origination base station 10 is lost and attempted transmission of reverse link data is futile, because such transmission would occur on frequency $f2$ and origination base station 10 does not monitor frequency $f2$. FIG. 2A plots the frequency used by a prior art mobile station 5 versus time. It is shown that while the mobile station is tuning to $f2$, performing the search, and retuning to $f1$ that erasures of traffic data are occurring. In one IS-95 system, depending on the number of offsets prescribed to search, several 20 ms frames of data could be lost during the erasure period.

In accordance with the present invention, when mobile station 5 is directed to tune to frequency $f2$ by origination base station 10, instead of searching for prescribed offsets, as was done in the prior art, mobile station 5 records samples of the signal on frequency $f2$ and stores those samples in memory. It will be understood that any memory device that is capable of saving the information for processing at a later time can be used, such as a random access memory (RAM). As soon as a sufficient number of samples have been taken, mobile station 5 retunes to frequency $f1$ and resumes communication with origination base station 10 over the forward and reverse links 12, 14.

Figure 2B:
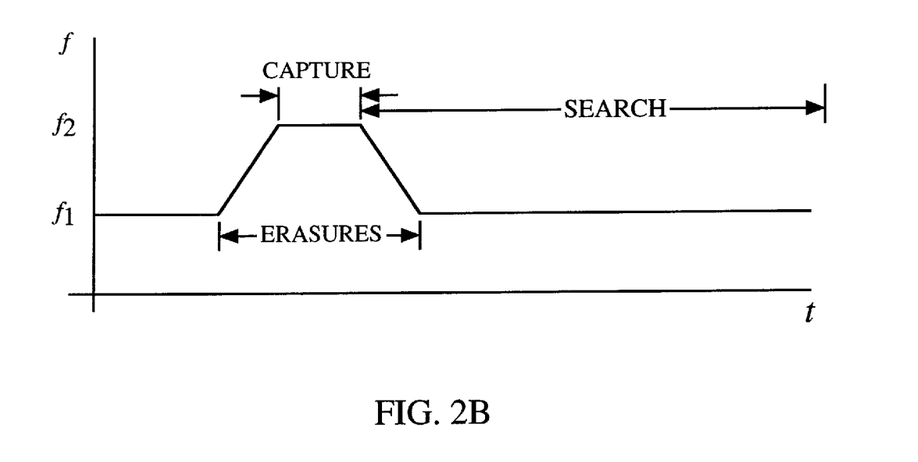

FIG. 2B illustrates the amount of time during which the mobile station 5 is tuned to frequency $f2$ in accordance with the present invention with respect to the amount of time required in the prior art as shown in FIG. 2A. Once data is captured, the search is performed off-line (i.e., while the mobile station 5 is tuned to frequency $f1$). Accordingly, communications resume between mobile station 5 and origination base station 10 more quickly than is possible if the information that is received is processed while the receiver remains tuned to frequency $f2$. The duration of time that erasures are introduced by being tuned to frequency $f2$ is significantly less with the present invention than with the methods of the prior art. In an IS-95 system, the tuning and retuning can be performed in approximately 4 ms. The memory size requirements in such a system allows for 512 chips of data sampled at twice the chip rate, with 4 bits/sample for both the I and Q channels. This results in a storage requirement of 1024 bytes. It will be obvious to one skilled in the art that alternate values can be substituted for those above, each with known tradeoffs in complexity and performance. The capture time in such an embodiment of the present invention is approximately 0.5 ms. An IS-95 data frame is 20 ms in duration. Therefore, for this example the total erasure time of approximately 5 ms does not even corrupt an entire frame.

In accordance with one embodiment, the search for an alternate frequency $f2$ is aligned with lower rate frames, such as ⅛ rate frames. In this case, the amount of data erased will often be so insignificant as to be correctable by coding and interleaving, such that no errors result.

In an alternative embodiment, to reduce memory requirements, a smaller sample size can be recorded from frequency $f2$. Those results can be used to compute partial results in an off-line search. Return trips to frequency $f2$ by mobile station 5 can be performed until the search results are complete. Examples of search implementations are described below.

FIG. 2B shows that the time required for searching is the same as in FIG. 2A, even though the search is performed while receiving and transmitting on $f1$. However, as can be seen from FIG. 2B, determining the final search result requires more time due to the fact that the search and the capture are not done concurrently, as shown in FIG. 2B. Nonetheless, intermediate search results can be transmitted to origination base station 10 as they become available, since mobile station 5 is in communication with origination base station 10 during the search.

The present invention results in a further improvement, because the off-line search need not be performed in "real time". The search can be performed as fast as current technology allows the circuits to run, or within power budgets, a tradeoff common in the art. As such, the system can be designed so that both the erasure rate and search time are greatly reduced in comparison with the methods of the prior art.

Because of the possibility of rapid variations in the received signal due to the changing environment in which mobile station 5 operates, it may be desirable to repeat the process of sampling the alternate frequency $f2$ a number of times if a large number of offsets are to be searched. Repeating the process allows for use of fresh data, while the improvements provided by the present invention reduce the frame error cost associated with repeat ventures to the alternate frequency.

Figure 3:
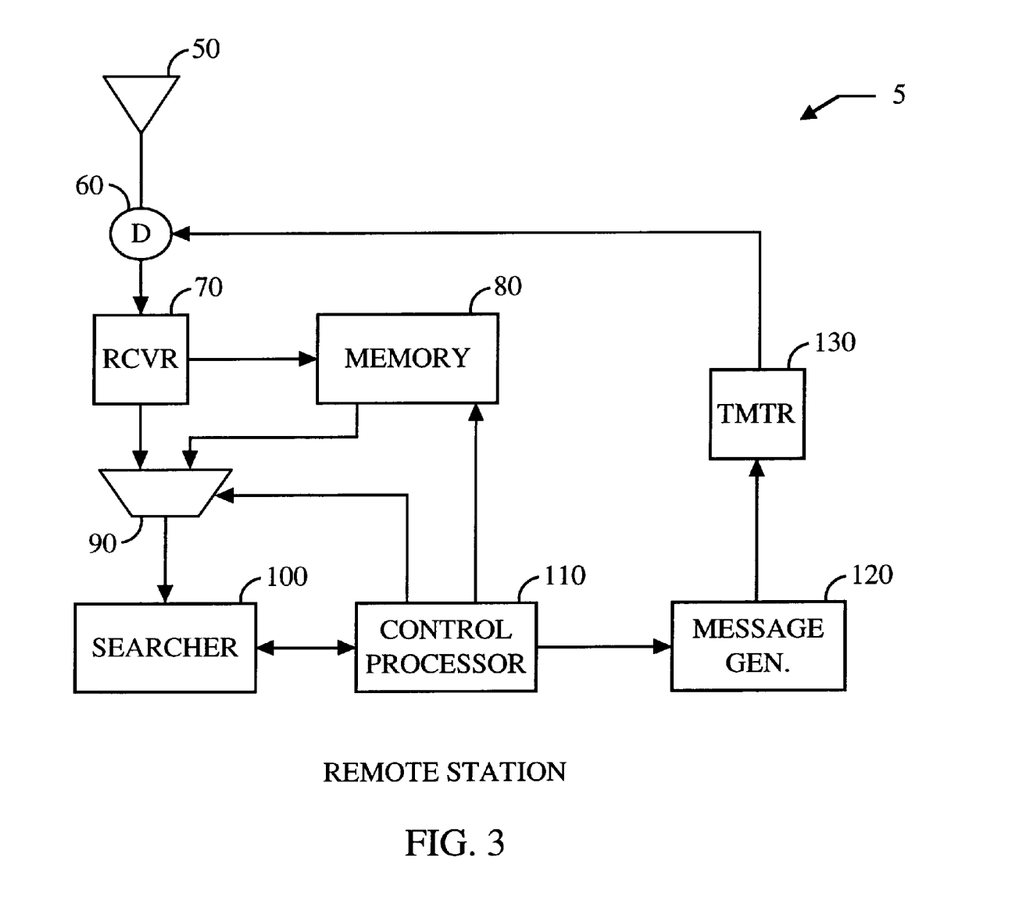
FIG. 3 is an illustration of a mobile station in accordance with the present invention.

FIG. 3 depicts a block diagram of one embodiment of a mobile station 5 in accordance with the present invention. Forward link signals are received at antenna 50 and passed through duplexer 60 to receiver 70. Initially, receiver 70 is directed to receive on frequency $f1$. After downconversion and amplification in receiver 70, the forward link signals are demodulated according to the IS-95 standard in a demodulator (not shown). In normal operation, the received signal is simultaneously sent to searcher 100 through multiplexer ("mux") 90 for non-handoff search processing.

When a Tune_Message is received from the base station directing the mobile station to tune to frequency $f2$, control processor 110 directs receiver 70 to tune to frequency $f2$. Communications with origination base station 10 will be interrupted while mobile station 5 is tuned to frequency $f2$. Control processor 110 further directs memory 80 to begin storing samples of the incoming signal at the prescribed sampling rate. After the predetermined number of samples have been collected in memory 80, control processor 110 directs receiver 70 to retune to frequency $f1$. Subsequently, normal communication with origination base station 10 resumes.

Meanwhile, control processor 110 initiates the off-line search. This is accomplished by directing mux 90 to cease directing samples from receiver 70 to searcher 100, and to instead direct samples from memory 80 to searcher 100. Searcher 100 can be any searcher type, some of which are described below as examples. Control processor 110 directs searcher 100 to complete the search of each offset given in the prescribed set of offsets received from origination base station 10. When results become available from searcher 100, control processor 110 delivers those results to message generator 120. In one instance, the results are based upon hypotheses, as is known in the art. Control processor 110 can transfer each result as it becomes available for transmission, or it can wait until all hypotheses to have been searched. Control processor 110 can select a subset of pilots detected based on signal strength, for example, for delivery to origination base station 10, or all pilot data can be transmitted for further processing in the base station.

Message generator 120 formats the results into messages suitable for transmission by transmitter 130. Implicit in transmitter 130 is a modulator, which modulates according to the IS-95 standard in the preferred embodiment. The reverse link signal generated in transmitter 130 is provided for transmission on antenna 50 through duplexer 60.

In one embodiment of the present invention, searcher 100 comprises a search engine, such as is disclosed in copending U.S. Pat. No. 5,805,648 entitled "METHOD AND APPARATUS FOR PERFORMING SEARCH ACQUISITION IN A CDMA COMMUNICATION SYSTEM", issued Sep. 8, 1998, assigned to the assignee of the present invention and incorporated herein by reference. The searcher described in the '648 patent employs a multiple dwell serial acquisition technique. As mentioned above, any search technique can be used in the present invention, and many such techniques are well known in the art.

Figure 4:
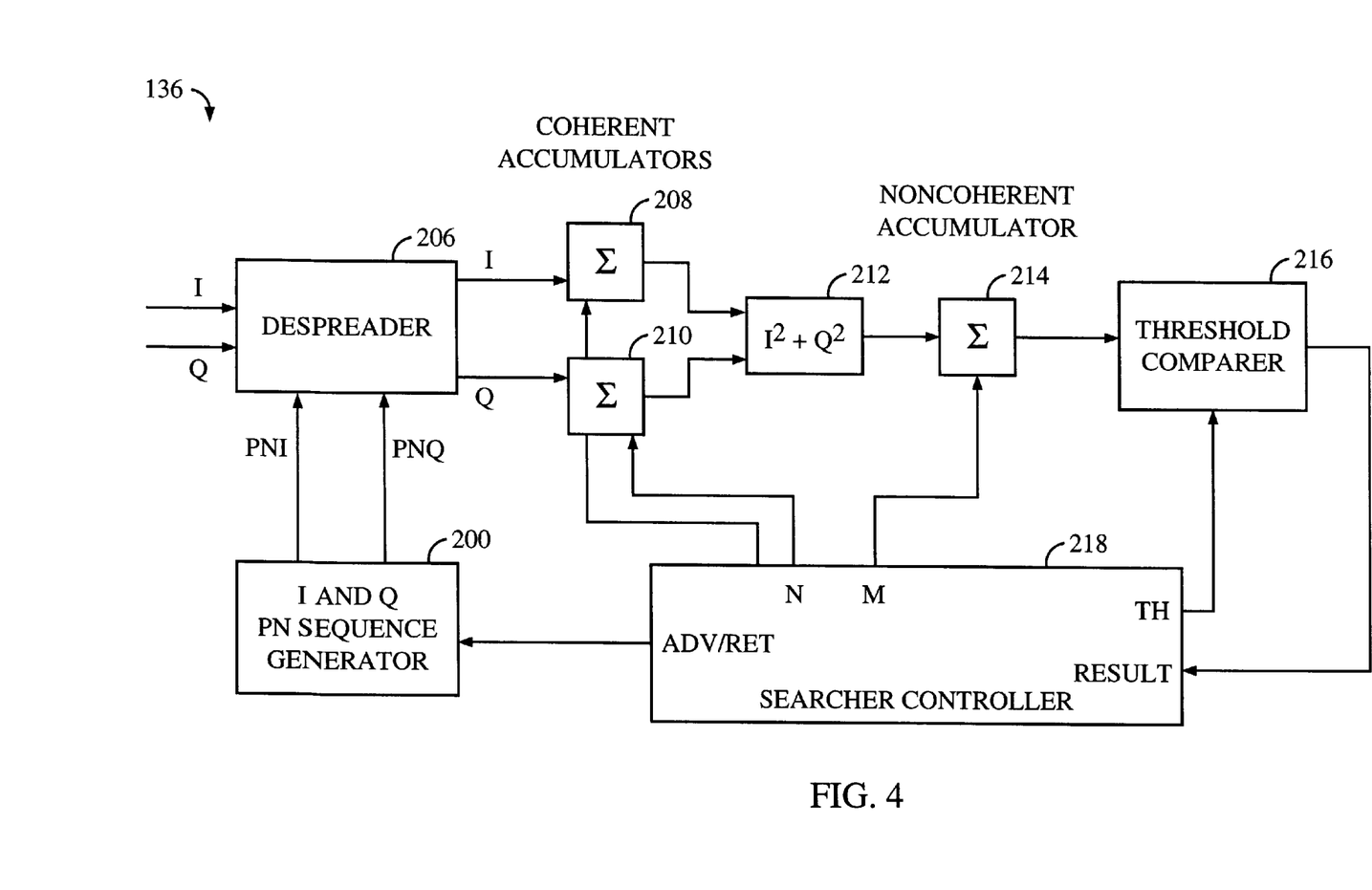
FIG. 4 is an illustration of one embodiment of a search engine used in the present.

FIG. 4 is a block diagram of the search engine as disclosed in the '648 patent. As described above, I and Q samples come from those stored in memory while mobile station 5 was tuned to alternate frequency $f2$, or the samples come from those currently generated in receiver 70 for use in real time searching. Techniques for real time searching, such as disclosed in the '721 application, are well known in the art. The technique for searching the stored samples from alternate frequency $f2$ will be described in detail below.

I and Q samples enter despreader 206 and are despread using PNI and PNQ sequences as generated by PN sequence generator 200. In one embodiment of the present invention, the PN sequences generated in PN sequence generator 200 are generated using maximal length shift registers (not shown). Despreader 206 multiplies each I and Q sample by the corresponding PNI and PNQ value and provides those two output products to coherent accumulators 208 and 210.

When performing off line searching, it is important to "rewind" the maximal length shift registers inside of PN sequence generator 200 to align the PNI and PNQ sequences with the sequences that were used to generate the signals from which the I and Q samples were recorded. A hypothetical phase offset to search is given to PN sequence generator 200 by searcher controller 218, and that hypothesis is tested as described below.

The despread I and Q values are accumulated in coherent accumulators 208 and 210, respectively. The duration of the accumulation in accumulators 208 and 210 is determined by searcher controller 218. Each accumulation from accumulators 208 and 210 is squared and those results are summed in squaring means 212. The sum of the squares is provided by squaring means 212 to noncoherent accumulator 214. Noncoherent accumulator 214 determines an energy value from the output of squaring means 212 by accumulating for a duration, M, given by searcher controller 218. Noncoherent accumulator 214 serves to counteract the effects of a frequency discrepancy between the base station transmit clock and the mobile station receive clock and aids in the detection statistic in a fading environment. Noncoherent accumulator 214 provides the energy signal to threshold comparer 216. Threshold comparer 216 compares the energy value to a threshold provided by searcher controller 218. Searcher controller 218 can examine the results of the comparisons and determine whether the current offset hypothesis being searched is likely to contain a valid pilot signal and thus be usable for demodulation.

Figure 5:
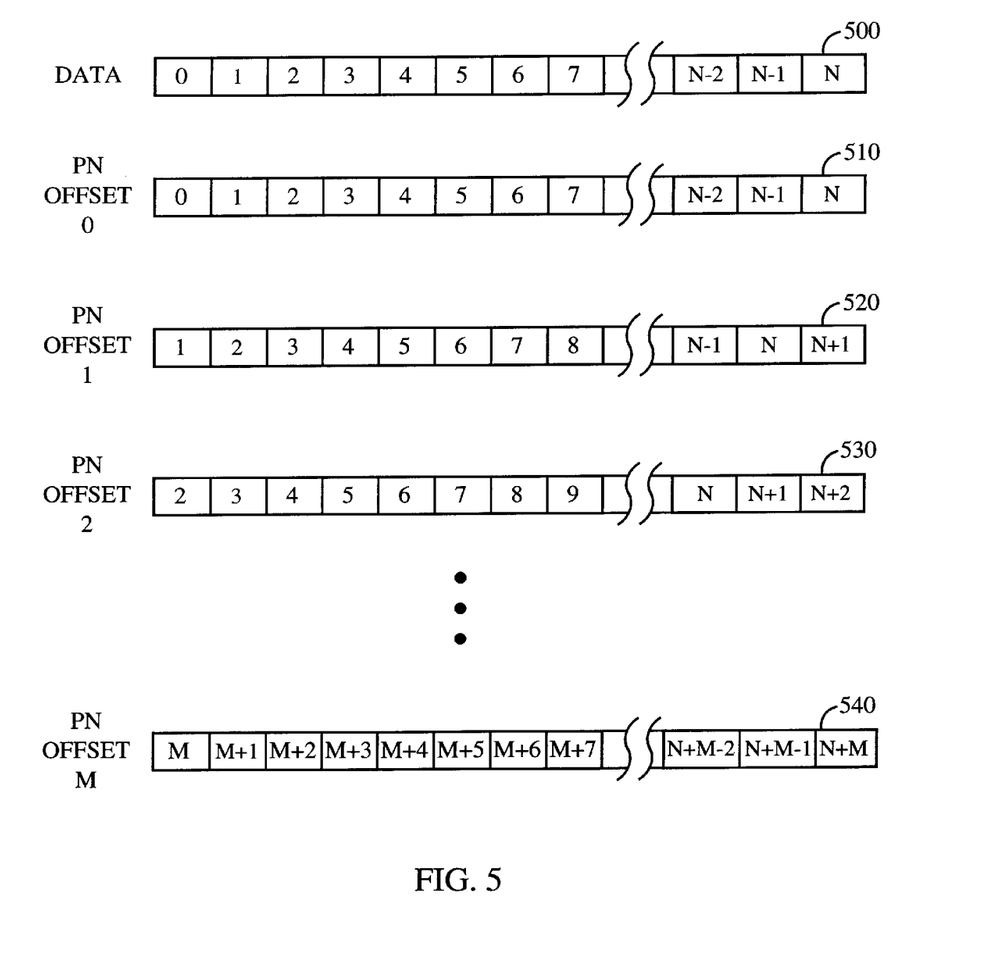
FIG. 5 depicts the correlations necessary to search a window of offsets using sampled data in accordance with the present invention.

FIG. 5 depicts the correlations required to search a window of hypotheses from offset 0 to offset M. First, an offset of 0 is searched. PN sequence generator 200 is "rewound" to the state that was current when the I and Q samples were recorded. Then the 0th PNI and PNQ value are used to despread the 0th I and Q data values, respectively, as depicted by the alignment of PN sequence 510 with data sequence 500. Each subsequent value of PNI and PNQ is used to despread the corresponding data values until the Nth values have been despread. These despread values are processed as described above.

Following the conclusion of the search of offset 0, an offset of 1 is to be searched. PN sequence generator 200 is "rewound" to offset 1, and despreading occurs as described for offset 0 above, except the despreading is done as shown by the alignment of PN sequence 520 with data sequence 500. In this case, PN sequence 1 is used to despread data sequence 0, and so on until PN sequence N+1 is used to despread data sequence N. Again the despread values are processed as described above until the offset 1 search is complete. Offset 2 is searched as shown by the alignment of PN sequence 530 with data sequence 500. The foregoing process is repeated as necessary until M+1 offsets have been searched, as depicted by the alignment of PN sequence 540 with data sequence 500. Although the foregoing example of a linear sweep of M+1 offsets was used to describe the present invention, it is clear that in practice any set of offsets could be searched in any order deemed appropriate.

Figure 6:
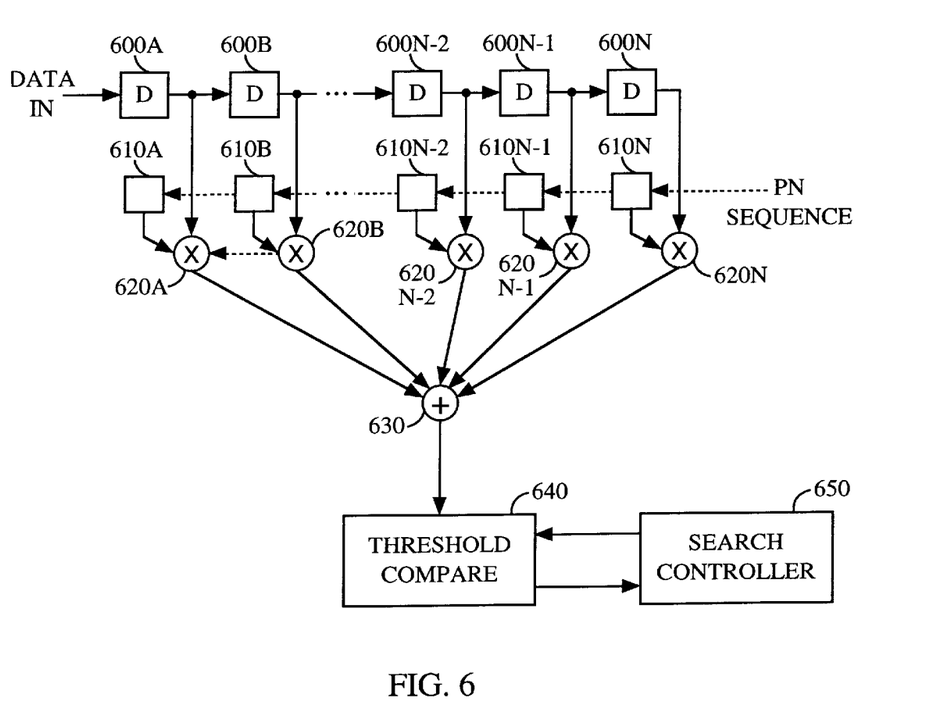
FIG. 6 is an illustration of an alternate search engine configured for use in the present invention.

An alternate embodiment of the search engine of searcher 100 is a modification to the well-known technique of employing a matched filter for acquisition of a spread spectrum signal. This matched filter technique is described in "Spread Spectrum Communications Handbook", by Simon, et. al., published by McGraw-Hill, Inc., in part 4, chapter 1, section 1.5.

FIG. 6 shows the embodiment of a modified matched filter search engine which affords benefits particular to the present invention. Data is input to the serial chain of delay elements 600A–600N. During each cycle, the data stored in delay elements 600A–600N are multiplied in multipliers 620A–620N with tap values 610A–610N. The tap values are determined by a section of the PN sequence with which the data is to be correlated. Tap values 610A–610N remain constant for the duration of the hypothesis test. Tap values 610A–610N can be parallel loaded or serially shifted in, as shown, when a different section of the PN sequence is to be correlated. The results of multipliers 620A–620N are summed in summer 630 and provided to threshold compare block 640. Threshold compare block 640 compares the output of summer 630 with a threshold provided by search controller 650. When a threshold has been exceeded, it is likely that a valid pilot signal is present at the offset given by the segment of the PN sequence currently stored in tap values 610A–610N. Search controller 650 also controls the shifting of data into delay elements 600A–600N as well as the updating of tap values 610A–610N.

When this search engine is used in real time search mode, data can be shifted in to delay elements 600A–600N and correlated with a predetermined segment of the PN sequence stored in tap elements 610A–610N, just as is done in the prior art. However, when the searcher is to be used in off-line searching to facilitate the mobile station assisted hard handoff, under control of search controller 650 the sampled alternate frequency f2 data can be shifted into delay elements 600A–600N. Once loaded, no further shifting of data will occur in delay elements 600A–600N. Then tap elements 610A–610N can be used to continuously shift in PN sequence data to correlate with the fixed length of stored data in delay elements 600A–600N. In this manner, the data in delay elements 600A–600N have effectively become the tap values of the matched filter, and the tap values 610A–610N serve as data delay elements. The rest of the circuitry is used in exactly the same manner as described above. Hence, under simple control by search controller 650 this modified matched filter search engine can easily be switched between standard on-line searching of real time data and off-line searching of stored data in accordance with the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for minimizing the amount of time during which communication between a mobile station and a fixed communication system is lost during hard handoff, the method comprising the steps of:
   (a) tuning a receiver from an origination frequency to an alternative frequency;
   (b) receiving signals at the alternative frequency from destination base stations;
   (c) storing the signals received at the alternative frequency;
   (d) retuning the receiver to the origination frequency;
   (e) at the mobile station concurrently both:
      (e1) receiving signals at the origination frequency from an origination base station; and
      (e2) analyzing the stored signals to determine whether the alternative frequency can support communications between the mobile station and the destination base stations; and
   (f) enabling hard handoff of the mobile station from the origination base station to the destination base station if the analysis of the stored signals determines that the alternative frequency can support communications between the mobile station and the destination base station.

2. The method of claim 1, further comprising the step of the origination base station transmitting a tune message to the mobile station, said tune message directing the mobile station to tune to the alternative frequency.

3. A method for use in a communications system which includes:
   (a) an origination base station operating at an origination frequency;
   (b) destination base stations operating at an alternative frequency; and
   (c) a mobile station tunable to operate at either the origination frequency or the alternative frequency;
the method being characterized by the steps of:
   (d) the mobile station tuning from the origination frequency to the alternative frequency;
   (e) the mobile station receiving signals at the alternative frequency from the destination base stations;
   (f) storing the signals received at the alternative frequency;
   (g) the mobile station retuning to the origination frequency;
   (h) at the mobile station concurrently both:
      (h1A) transmitting signals to the origination base station;
      (h1B) receiving signals from the origination base station; or
      (h1C) both transmitting signals to and receiving signals from the origination base station; at the origination frequency; and
      (h2) analyzing the stored signals to determine whether the alternative frequency can support communications between the mobile station and the destination base stations; and
   (i) enabling hard handoff of the mobile station from the origination base station to the destination base station if the analysis of the stored signals determines that the alternative frequency can support communications between the mobile station and the destination base station.

4. The method of claim 3, further characterized by including the step of the origination base station transmitting a tune message to the mobile station, said tune message directing the mobile station to tune to the alternative frequency.

5. Apparatus for minimizing the amount of time during which communication between a mobile station and a fixed communication system is lost during hard handoff, the apparatus comprising:
   (a) means for tuning a receiver from an origination frequency to an alternative frequency;

(b) means for receiving signals at the alternative frequency from destination base stations;

(c) means for storing the signals received at the alternative frequency;

(d) means for retuning the receiver to the origination frequency;

(e) means, at the mobile station, for concurrently both:
   (e1) receiving signals at the origination frequency from an origination base station; and
   (e2) analyzing the stored signals to determine whether the alternative frequency can support communications between the mobile station and the destination base stations; and (f) means for enabling hard handoff of the mobile station from the origination base station to the destination base station if the analysis of the stored signals determines that the alternative frequency can support communications between the mobile station and the destination base station.

6. The apparatus of claim 5, further comprising means for the origination base station transmitting a tune message to the mobile station, said tune message directing the mobile station to tune to the alternative frequency.

7. Apparatus for use in a communications system which includes:

(a) an origination base station operating at an origination frequency;

(b) destination base stations operating at an alternative frequency; and (c) a mobile station tunable to operate at either the origination frequency or the alternative frequency;

the apparatus being characterized by:

(d) means for the mobile station tuning from the origination frequency to the alternative frequency;

(e) means for the mobile station receiving signals at the alternative frequency from the destination base station;

(f) means for storing the signals received at the alternative frequency;

(g) means for the mobile station retuning to the origination frequency;

(h) means, at the mobile station, for concurrently both:
   (h1A) transmitting signals to the origination base station;
   (h1B) receiving signals from the origination base station; or
   (h1C) both transmitting signals to and receiving signals from the origination base station; at the origination frequency; and
   (h2) analyzing the stored signals to determine whether the alternative frequency can support communications between the mobile station and the destination base stations; and (i) means for enabling hard handoff of the mobile station from the origination base station to the destination base station if the analysis of the stored signals determines that the alternative frequency can support communications between the mobile station and the destination base station.

8. The apparatus of claim 7, further characterized by including means for the origination base station transmitting a tune message to the mobile station, said tune message directing the mobile station to tune to the alternative frequency.

* * * * *

UNITED STATES PATENT AND TRADEMARK OFFICE
CERTIFICATE OF CORRECTION

PATENT NO.    : 6,134,440
DATED         : October 17, 2000
INVENTOR(S)   : Peter J. Black It is certified that error appears in the above-identified patent and that said Letters Patent is hereby corrected as shown below:

Drawings,
Sheet 1, Fig. 1, please label the forward link -- 12 -- and the reverse link -- 14 --, and add an arrow showing movement of mobile station 5 traveling from the origination system into a destination system, as depicted in the specification.

Column 1,
Line 24, please delete "SYSTEMS" and replace with -- SYSTEM --;
Line 53, please delete "On" and replace with -- One --;

Column 2,
Line 33, after "is" insert -- a --;

Column 4,
Line 65, please delete "25"; and

Column 7,
Line 65, please delete "'721 application" and replace with -- '648 patent --.

Signed and Sealed this

Twenty-eighth Day of June, 2005

JON W. DUDAS
*Director of the United States Patent and Trademark Office*

FIG. 1